June 20, 1967 L. D. TSCHOPP 3,327,001
PREPARATION OF UNSATURATED HYDROCARBONS
Filed Sept. 30, 1963
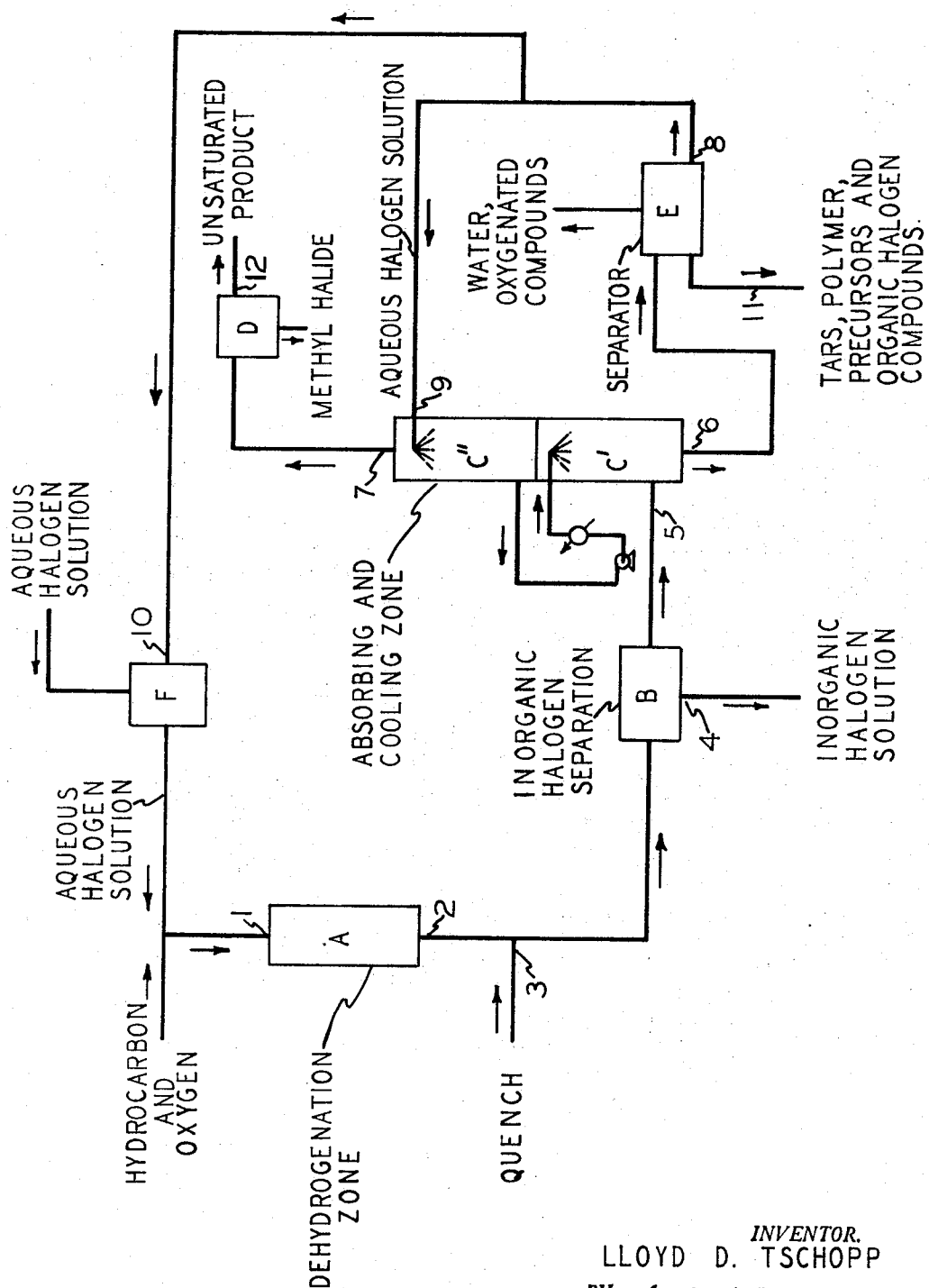
INVENTOR.
LLOYD D. TSCHOPP
BY
ATTORNEY United States Patent Office 3,327,001
Patented June 20, 1967

3,327,001
PREPARATION OF UNSATURATED
HYDROCARBONS
Lloyd D. Tschopp, Houston, Tex., assignor to Petro-Tex
Chemical Corporation, Houston, Tex., a corporation of
Delaware
Filed Sept. 30, 1963, Ser. No. 312,477
5 Claims. (Cl. 260—680)

This application relates to a process for the preparation of unsaturated hydrocarbons and more particularly relates to an improved method for the separation and purification of unsaturated hydrocarbons produced by the dehydrogenation of aliphatic hydrocarbons utilizing oxygen in the dehydrogenation reaction.

Olefins and diolefins such as butene and butadiene are commercially produced by the catalytic dehydrogenation of more saturated aliphatic hydrocarbons. Butadiene is produced in large quantities by the dehydrogenation of butane and butene in fixed bed reactors. An improved process whereby higher conversions, yields and selectivities of product as well as other improvements is desired.

One improvement in the process for the preparation of unsaturated hydrocarbons such as butadiene-1,3 is the process whereby aliphatic hydrocarbons such as butane and butene are dehydrogenated at elevated temperatures in the presence of catalysts and oxygen. Improved results and yield of product are thereby obtained. However, the product streams contain not only the desired unsaturated hydrocarbon, but also various polymers, tars, and precursors thereof as well as various oxygenated compounds such as aldehydes and other carbonyl compounds. The gaseous streams also contain steam which must be removed. It is one of the objectives of this invention to provide a process for the removal of steam, oxygenated compounds, polymers, tars and precursors thereof from the unsaturated organic product. It is also an object of this invention to provide an improved process for cooling the gaseous stream.

The dehydrogenation process utilizing oxygen may be further improved by the addition of halogens to the dehydrogenation zone. But when hydrocarbons are dehydrogenated in such a manner utilizing oxygen and halogen, the salogens also contribute to the formation of polymers, tars and precursors thereof. Some of these undesirable by-products are halogen compounds. It is a primary object of this invention to provide a method for the removal of these halogen compounds, polymers, tars and precursors thereof from such a process. Another object is to provide a process for the simultaneous production of dehydrogenated hydrocarbons and methyl halides.

According to the processes of this invention, aliphatic hydrocarbons are dehydrogenated at an elevated temperature in a dehydrogenation zone in the presence of oxygen, and preferably halogen. The dehydrogenation zone effluent of a temperature of at least 425° C. is then cooled to a temperature of 99 to 350° C., preferably by a procedure including quenching, and thereafter is contacted countercurrently with a cooling liquid in a vertical enclosed combination absorbing and cooling column. The temperature at the bottom of this column should be from about 49 to 110° C. and the temperature at the top of the column should be from 15 to 99° C. In this absorbing and cooling column oxygenated compounds and various tars, polymers and precursors thereof are dissolved in the equeous contacting liquid. In this column also from 30 to 99 weight percent of the steam in the incoming gases is condensed. The water taken from the bottom of the column contains oxygenated hydrocarbons and various tars, polymers and precursors thereof. When halogen is used in the system, halogen compounds such as ammonium iodide are also dissolved in this condensate. This condensate is then fed to a combination springing, separating and cooling tower, referred to herein as the separating tower. The separating tower is open to the atmosphere. In the separating tower from about 3 to 12 weight percent of the water is evaporated to the atmosphere together with oxygenated hydrocarbons. The water recovered at the bottom of the separating tower contains tars, polymers and precursors thereof, and these materials may be removed from the water at the base of the separating tower. The water collected from the separating tower may also contain halogen or halogen compounds in a concentration greater than that of the incoming water. The water or solution collected at the base of the separating tower may then be used as the cooling medium fed to the sprays of the cooling column or may be fed to the dehydrogenation reactor as a source of halogen or may be used as quench solution for the dehydrogenation effluent. The over head from the cooling column contains the unsaturated hydrocarbon product which may then be further purified such as by separation of the hydrocarbon components.

A preferred embodiment of the invention utilizing halogen is illustrated in the drawing. A gaseous mixture of the hydrocarbon to be dehydrogenated, oxygen and halogen are fed by line 1 to the dehydrogenation zone A. The dehydrogenation process may be conducted in the absence of contact catalysts, but better results are obtained if the reaction is conducted in the presence of metal catalysts. The dehydrogenation reactor may be a fixed or fluid bed reactor. Reactors conventionally used for the dehydrogenation of hydrocarbons to butadiene may be employed. The total pressure in the dehydrogenation zone will normally be about atmospheric pressure. However, higher pressures or vacuum may be used. Higher pressures such as up to about 100 to 200 p.s.i.g. may also be employed. The dehydrogenation reaction will normally be conducted at a temperature of reaction between about 400° C. to about 850° C. or higher, such as about 1000° C. The temperature of the reaction is measured at the maximum temperature in the reactor. The flow rates of the reactants may be varied quite widely and will be dependent somewhat on whether fixed or fluid bed reactor is employed. Good results have been obetained with flow rates of the hydrocarbon to be dehydrogenated ranging from about ¼ to 25 liquid volumes of hydrocarbon to be dehydrogenated per volume of reactor zone per hour, with the volumes of hydrocarbon being calculated as the equivalent amount of the liquid hydrocarbons at standard conditions of 15.6° C. and 760 millimeters of mercury absolute. The reaction zone is defined as the portion of the reactor which is at a temperature of at least 400° C. The residence or contact time of the reactants in the dehydrogenation zone depends on several factors involved in the reaction. Contact times such as about 0.001 to about 5 or 10 seconds have been found to give excellent results. Under certain conditions, higher contact times may be utilized. Generally, the contact time will be between about 0.01 and 2 seconds. Contact time is the calculated dwell time of the reaction mixture in the reaction zone assuming the mols of product mixture are equivalent to the mols of feed.

The effluent 2 from the dehydrogenation zone will contain the impure unsaturated organic products, various impurities including oxygenated hydrocarbons and perhaps some unconverted feed or unconverted hydrocarbon, oxygen, steam and halogen in various forms and compounds thereof. Nitrogen may also be present, for example, if air was used as the source of oxygen. Steam may be present in an amount up to 96 mol percent of the total effluent, such as from about 5 to 96 mol percent, the organic phase including dehydrogenated product, any unreacted feed, oxygenated hydrocarbons, polymer and tar and precursors thereof and any organic decomposition products usually range from about 3 to 50 mol percent of the effluent and generally will be within the range of about 3 to 30 or 35 mol percent of the effluent.

The effluent gases 2 leaving the dehydrogenation zone will generally be at a temperature of about or greater than 400° C. or 450° C. to 1100° C., depending upon the particular dehydrogenation process. Preferably, the effluent gases are then cooled by quench 3. A preferred quench will be an aqueous quench containing from 0 to 55 mol percent, preferably from 0.005 to about 45 mol percent halogen, calculated on the basis of the equivalent mols of elemental halogen. The quenched gases will then be at a temperature of no greater than about 425° C. or 450° C. such as less than 375° C. The gaseous stream at this point may contain less than 10 mol percent halogen based on the total organic component of the stream, such as less than 5 mols percent, for example, the gaseous stream might contain from 0.001 to about 3 or 10 mol percent halogen based on the total organic component. This cooled gaseous stream may then be conducted to the absorbing and cooling zone C. However, better results are usually obtained if some of the water is removed at B from the gaseous stream prior to passing the stream to the absorbing and cooling zone C. In processes utilizing halogen, this step is particularly preferred in order to remove a portion of the inorganic halogen. In this preferred step for the removal of halogen, prior to contacting the gaseous stream in the absorbing and cooling zone, from about 25 to about 99 mol percent of any inorganic halogen is separated in B and preferably from at least 50 or 60 mol percent to about 99 mol percent of the inorganic halogen is removed. Separation may be by any means, such as by cooling the gases to a temperature low enough to condense the halogen, with the cooled gases being at a temperature of less than 300° C. The exact temperature to which the gases must be cooled will be dependent upon such factors as the amount of steam and halogen present in the gaseous stream, and the form in which the halogen is present. Inorganic halogens such as ammonium halide may be cooled and separated as by allowing the ammonium halide to plate out on surfaces provided for such purposes, or the condensed inorganic halogen may be filtered out. A portion of the steam may be removed by condensation either simultaneously with the separation of the inorganic halogen or in a separate step, preferably from 25 to 95 mol percent of the steam present in the gaseous stream will be separated prior to contacting the gaseous phase with cooling medium in zone C. This inorganic halogen solution may be separated by line 4.

A preferred composition 5 to be fed to the absorbing and cooling zone C will contain from about 3 to about 50 mol percent inorganic component such as from 5 to 30 mol percent organic component. The gaseous stream will contain from 0 to 80 or 95 mol percent steam. Inorganic halides may be present from about 0.0001 to 25 mol percent based on the organic component, but better results are obtained if the inorganic halides are present in an amount of less than 5 mol percent and more preferably less than 2 mol percent of the organic component. Organic halogen compounds may be present, such as in amount from 0.0001 to 5 or 15 mol percent such as between 0.001 and 0.10 or 1.0 mol percent of the organic component. The major portion of these organic halogen compounds will have from 1 to 12 carbon atoms and will contain from 1 to 4 atoms of halogen. The oxygenated compounds in the feed through line 5 to the absorbing and cooling zone C may vary widely but ordinarily will be present from 0.01 to 3 or 5 or higher mol percent oxygenated hydrocarbons based on the total organic component.

The gaseous stream 5 to be contacted in the absorbing and cooling zone C will generally be at a temperature of about 90 to 125° C., but preferably will have a temperature within the range of about 95 to 105° C. The temperature at the bottom of column C will be from 49 to 110° C., but better results have been obtained with temperatures of 82 to 105° C. It has been found that when the bottom of column C is operated within these temperature ranges, that the oxygenated hydrocarbons, tars, polymers, and precursors thereof are contained in the aqueous condensation, leaving the bottom of the column at 6. The gaseous composition passes through the absorbing and cooling zone C and leaves as an overhead via line 7. The temperature at the top of the zone C should be from 15 to 99° C. with the preferred range being from 27 to 49° C. The aqueous solution or mixture leaving at 6 will ordinarily contain from about 0.2 to 25 weight percent organic component. This organic component of the composition 6 leaving the bottom of zone C will comprise the oxygenated hydrocarbons, and the tars, polymers and precursors thereof, including organic halogen compounds. Additionally, this composition may contain halogen in inorganic form such as elemental halogen, hydrogen halide acids or ammonium halide. The halogen may suitably be present in the aqueous mixture in an amount from 0 to 5 weight percent, (calculated as equivalent weight of elemental halogen) based on the total weight of the aqueous mixture. Best results have been obtained when the halogen is present in an amount of 0.005 to 2 weight percent of the total aqueous mixture. This aqueous mixture 6 is fed to the separator E wherein water and volatile oxygenated hydrocarbons are removed by evaporation to the atmosphere and the aqueous halogen solution may be removed from the bottom of the separator E via line 8. The volatile oxygenated hydrocarbons will ordinarily contain from 1 to 6 carbon atoms and from one to two oxygen atoms. These volatile oxygenated compounds generally have boiling points of from about 20 to 120° C. Typical volatile oxygenated hydrocarbons are furan, acrolein, methacrolein, crotonaldehyde butyraldehyde and isobutyraldehyde and so forth.

The quantity of the volatile oxygenated hydrocarbons in the aqueous mixture leaving the separator E will be somewhat dependent upon the concentration in the incoming feed via line 6 but ordinarily will be in an amount of less than 5 or 10 weight percent of the total aqueous mixture. Preferably, the quantity of volatile oxygenated hydrocarbons will be reduced by at least 10 percent and ordinarily a greater amount will be removed. According to a preferred feature of this invention, the amount of inorganic halogen leaving the separator E through line 8 will be present in an amount of at least 5 percent greater than the concentration of the inorganic halogens in the incoming aqueous mixture 6 to the separator. This aqueous halogen solution leaving the separator through line 8 in this preferred procedure will contain inorganic halogen, and will generally be at a temperature of about 5 to 55° C. This solution may then be used as spray water for the cooling column C by feeding to the sprays through line 9, or the halogen solution may be sent to the reactor through line 10 for reuse in the dehydrogenation zone or may be used as quench water below the reactor A (not shown). The concentration of this halogen solution 10 may be adjusted in the make-up step F. If desired, the tars, polymers and precursors thereof may be removed such as through line 11, or they may be separated (step not shown) from the aqueous halogen solution leaving at line 8. These materials may be separated from the water by any conventional means for separating solids from liquids such as by skimming, filtration and so forth.

If halogen has been used in the dehydrogenation zone, the purified gaseous composition leaving the absorbing and cooling zone C as an overhead via line 7 may still contain methyl halide, particularly methyl bromide. The methyl halide if present may be removed at D by any conventional method for separating methyl halides from hydrocarbon streams as by distillation. The gaseous composition leaving at line 12 may then be further purified such as by distillation to produce the desired unsaturated product.

The preferred compounds to be dehydrogenated are aliphatic hydrocarbons of 2 to 6 carbon atoms, which contain at least two adjacent carbon atoms, each of which carbon atom has at least one hydrogen atom attached. The dehydrogenation will produce compounds having double and/or triple bonds in aliphatic chains. Thus, butadiene-1,3 and/or vinylacetylene may be produced from butene-1 or butene-2 or mixtures thereof, and isoprene may be produced from any of the methyl butenes, such as 2-methyl butene-1, 2-methyl butene-2 or 2-methyl butene-3 or mixtures thereof. Isoprene may also be produced from methyl butanes, such as 2-methyl butane; also olefins and diolefins may be produced from saturated hydrocarbons, for example, vinyl acetylene, butadiene and butene may be produced from n-butane. A mixture of monoolefins and diolefins may also be produced, such as a mixture of butadiene-1,3 and butenes from a feedstock of a mixture of n-butane and butene. Good results have been obtained with a feed containing at least 50, or at least 75, mol percent of a monoethylenically unsaturated aliphatic hydrocarbon, such as the hydrocarbons of 4 to 5 carbon atoms having a straight chain of at least four carbon atoms and single double bond.

Oxygen will generally be supplied to the dehydrogenation zone in the range of about 0.20 mols of oxygen to 2.0 or 3.0 mols of oxygen per mol of hydrocarbon to be dehydrogenated. A preferred range for the oxygen is from about 0.3 to 1.50 mols of oxygen per mol of hydrocarbon to be dehydrogenated. Either pure oxygen or oxygen diluted with diluents may be utilized.

The source of any halogen fed to the dehydrogenation zone may be either elemental halogen or any compound of halogen which would liberate halogen under the conditions of reaction. Suitable sources of halogen are such as hydrogen iodide, hydrogen bromide and hydrogen chloride; aliphatic halides such as ethyl iodide, methyl bromide, 1,2-dibromo ethane, ethyl bromide, amyl bromide and allyl bromide; cycloaliphatic halides such as cyclohexylbromide; aromatic halides such as benzyl bromide; halohydrins such as ethylene bromohydrin; halogen substituted aliphatic acids such as bromoacetic acid; ammonium iodide; ammonium bromide; ammonium chloride; organic amine halide salts such as methyl amine hydrobromide; and the like. Mixtures of various sources of halogen may be used. The preferred sources of halogen are hydrogen bromide, hydrogen iodide, hydrogen chloride, ammonium bromide, ammonium iodide, ammonium chloride, alkyl halides of one to six carbon atoms and mixtures thereof, with the iodine and bromine compounds being particularly preferred, with the best results having been obtained with ammonium iodide, bromide or chloride. When terms such as halogen liberating materials or halogen materials are used in the specification and claims, this includes any source of halogen such as elemental halogens, hydrogen halides or ammonium halides. The amount of halogen, calculated as elemental halogen, may be as little as about 0.001 or less mole of halogen per mol of organic compound to be dehydrogenated to as high as 0.2 or 0.5 or higher. The preferred range is from about 0.001 to 0.09 mol of halogen.

The absorber and cooling zone C will preferably be a spray type column which may be open or packed. The preferred arrangement is to have at least two stages with the condensate or liquid from the second or subsequent stage being utilized as the cooling liquid for an earlier stage. For example, as shown in the drawing the hot liquid from the bottom of C″ is passed through a cooler and used as the spray for section C′. Best results are obtained using from two to six stages in order to obtain optimum absorption and separation in zone C. The separator E may be an atmospheric cooling tower or other device wherein the liquid containing the absorbed gas is passed downward over a surface which is open to the atmosphere. Generally the liquid will cascade over baffles or splash pieces in order to obtain greater contact of the liquid with the atmosphere.

The process of this invention is illustrated in the following example. A gaseous composition comprising hydrocarbons, air, steam, and ammonium bromide was dehydrogenated in a fixed bed catalyst reactor. The hydrocarbon composition comprised by mol percent approximately 49 percent butylene-2-lo, 44 percent butylene-2-hi, 2 percent butadiene-1,3,4 percent n-butane, with the remainder being saturated and unsaturated aliphatic hydrocarbons of from 4 to 5 carbon atoms. The total hydrocarbon composition was fed at a rate of 74.4 pounds per hour, with 69.6 pounds per hour of this being butene. The composition contained steam in an amount of 12 mols of steam per total mols of hydrocarbon. This amount of steam was 286 pounds per hour. Oxygen was fed in the form of air in an amount equivalent to 0.60 mols of oxygen per total mols of hydrocarbon. The feed rate for the air was 112 pounds per hour. Ammonium bromide was fed as an aqueous solution containing 28.5 weight percent ammonium bromide based on the total weight of the solution. The ammonium bromide was present in an amount calculated as equivalent to 0.015 mol of bromine ($Br_2$) per total mols of hydrocarbon.

The gaseous composition was passed through a fixed bed reactor. The catalyst particles were about 2 to 5 mesh size and contained 75 percent by weight carrier. The inlet temperature to the reactor was 980° F., the maximum temperature in the reactor was 1140° F., and the exit temperature from the reactor was 1110° F. The gaseous flow rate to the reactor was 1.25 liquid volume of gaseous hydrocarbon per volume of catalyst bed per hour (with the volume of liquid hydrocarbon being calculated at 60° F. and 760 mm. of mercury). The hot effluent gases from the reactor were quenched with an aqueous solution of ammonium bromide containing 28.5 weight percent ammonium bromide. The temperature of the quench solution was 230° F. and the quench solution was fed at a rate of 5,050 pounds per hour. The quenched gases were then at a temperature of about 250° F., and a pressure of 3.6 p.s.i.g. The quenched gaseous effluent was then contacted with 2,485 pounds per hour of an aqueous ammonium bromide solution containing 28.5 weight percent ammonium bromide. This contact was made in a pressure drop zone which was essentially two truncated cones joined at the small ends to form a throat. The ammonium bromide solution was sprayed into the throat of the pressure drop zone perpendicularly to the flow of the gases. The pressure drop across the pressure drop zone was approximately 60 inches of water. The temperature of the gaseous composition leaving the pressure drop zone was about 220° F. An aqueous halogen solution containing about 27 weight percent ammonium bromide was then separated from the gaseous stream in an amount of 40 pounds per hour of solution. This separation was accomplished by using a cyclone type separator. A portion of this recovered aqueous solution of ammonium bromide was cooled and used as quench water for the dehydrogenation reactor effluent, and another portion was used as the contacting water in the pressure drop zone, described above. The gaseous composition leaving the cyclone separator was then cooled in a condenser. The condensate from this step was an aqueous solution of ammonium bromide containing about 27 weight percent ammonium bromide. The gaseous composition leaving the condenser then comprised the remainder of the steam, some oxygen, inerts such as nitrogen, ammonium bromide, an organic phase including hydrocarbons, methyl bromide, organic bromides having 2 or more carbon atoms and oxygenated hydrocarbons such as aliphatic carbonyls. This gaseous composition was at a temperature of about 102° C. and contained approximately all of the uncondensable inerts such as the nitrogen fed to the dehydrogenation reactor. This composition contained approximately 78.0 mol percent steam, 7.2 mol percent organic component, with the remainder being essentially ammonium bromide, oxygen, and various gases such as nitrogen. The ammonium bromide was present in an amount of 8.3 mol percent based on the total mols of the organic component. The organic component comprised approximately 62.4 mol percent butadiene, 0.535 weight percent organic bromine compounds, 0.0020 mol percent organic carbonyl compounds with the remainder being essentially unsaturated aliphatic hydrocarbons such as butene and propylene.

The gaseous composition was fed into the bottom of a packed spray cooling column which was 1.2 feet in diameter and 14 feet high. The cooling column was packed with 11 feet of packing. The temperature at the bottom of the cooling column was 198° F. and at the top was 92° F. In this cooling column the gaseous mixture was contacted countercurrently with a spray of an aqueous solution of ammonium bromide. The pressure drop through the tower was about 8 inches of water, with the tower being operated at slightly above atmospheric pressure. The spray water was fed at the rate of 3,750 pounds per hour, and was at a temperature of 89° F. From the bottom of the cooling column was taken an aqueous solution of ammonium bromide and organic carbonyl compounds of from 2 to 5 carbon atoms. This aqueous solution amounted to 4,205 pounds per hour, and was at a temperature of 198° F. This aqueous solution contained tars and tarry precursors as well as 0.03 mol percent ammonium bromide and 0.0026 weight percent of organic carbonyl compounds. The aqueous solution taken from the bottom of the tower was fed to the top of the separator which was a conventional atmospheric cooling tower wherein the aqueous solution was flowed downward over splash pieces. In the separator operation, water and organic carbonyl compounds were evaporated to the atmosphere and the ammonium bromide and tars and precursors of tars were concentrated in the cooled water and collected at the base of the separator. The temperature of the aqueous composition of ammonium bromide and tars at the bottom of the separator was about 89° F. The tars and tarry precursors were separated from this solution by skimming the solution at the bottom of the separator. The water at the bottom of the separator contained about 0.0024 weight percent carbonyl compounds of 2 to 5 carbon atoms and 0.10 weight percent ammonium bromide. As mentioned above, this composition in an amount of 3,750 pounds per hour was fed to the top of the packed cooling column as cooling water.

Exit gases from the top of the packed cooling column had a temperature of about 92° F. and a flow rate of about 194 lbs./hr. The exit gases from the top of the packed cooling column contained 29.4 mol percent organic component and 5.2 mol percent steam. The organic phase contained 0.18 mol percent methyl bromide, 0.07 weight percent organic bromides having two or more carbon atoms, 83.0 mol percent $C_4$ hydrocarbons, less than 10 parts per million ammonium bromide and 0.0008 mol percent organic carbonyl compounds. The hydrocarbon phase contained 9.7 mol percent butylene-2 Lo, 8.0 mol percent butylene-2 Hi, 62.4 mol percent butadiene-1,3, 1.9 mol percent n-butane, 1.0 mol percent butylene-1, with the remainder being essentially $CO_2$ and aliphatic hydrocarbons of 2 to 5 carbon atoms.

The hydrocarbons from which the methyl bromide and carbonyls had been separated were then passed to a series of distillation and purification steps to separate the butadiene-1,3 product.

Although this example has illustrated the application of the invention to the separation of the impurities from the effluent of a dehydrogenation process utilizing halogen as well as oxygen, the invention is not so limited. Dehydrogenation processes wherein oxygen, without halogen, is fed to the dehydrogenation zone are entirely suitable.

I claim:
1. The process for the production of unsaturated hydrocarbons which comprises (1) dehydrogenating a hydrocarbon in a dehydrogenation zone by reacting in a dehydrogenation zone at an elevated temperature of at least 400° C. a mixture of the hydrocarbon to be dehydrogenated and oxygen to produce an impure dehydrogenation zone effluent comprising unsaturated hydrocarbon and oxygenated hydrocarbons; (2) cooling the said dehydrogenation zone effluent to a temperature of between 99° C. and 375° C. to form a gaseous cooled dehydrogenation zone effluent; (3) feeding the said cooled effluent to an absorbing and cooling zone; (4) in the said absorbing and cooling zone contacting the said gaseous cooled dehydrogenation zone effluent with an aqueous solvent for the oxygenated hydrocarbons; the temperature at the bottom of the absorbing and cooling zone being from about 49 to 110° C. and the temperature of the exit gases from the absorbing and cooling zone being from about 15 to 99° C., to form a solution of the said oxygenated hydrocarbons in the said aqueous solvent and also to form a purified gaseous overhead containing the unsaturated hydrocarbon; (5) feeding the said solution of oxygenated hydrocarbons to a separating and concentrating zone; said separating and concentrating zone being open to the atmosphere; (6) in the separating and concentrating zone evaporating to the atmosphere oxygenated hydrocarbons and water from the solution of oxygenated hydrocarbons and (7) recovering the unsaturated hydrocarbon product from the said purified gaseous overhead of step (4).

2. The process for the production of unsaturated hydrocarbons which comprises (1) dehydrogenating a hydrocarbon in a dehydrogenation zone by reacting at an elevated temperature of at least 400° C. a mixture of the hydrocarbon to be dehydrogenated and oxygen to produce an impure dehydrogenation zone effluent of a temperature of at least 425° C. comprising unsaturated hydrocarbon and oxygenated hydrocarbons; (2) cooling the said dehydrogenation zone effluent to a temperature of between 99° C. and 375° C. to form a gaseous cooled dehydrogenation zone effluent; (3) feeding the said cooled effluent to an absorbing and cooling zone; (4) in the said absorbing and cooling zone contacting the said gaseous cooled dehydrogenation zone effluent with an aqueous solvent for the oxygenated hydrocarbons; the temperature of the inlet gaseous mixture to the absorbing and cooling zone being from about 90 to 125° C., the temperature at the bottom of the absorbing and cooling zone being from about 49 to 110° C. and the temperature of the exit gases from the absorbing and cooling zone being from about 15 to 99° C., to form a solution of the said oxygenated hydrocarbons in the said aqueous solvent and also to form a purified gaseous overhead containing the unsaturated hydrocarbon; (5) feeding the said solution of oxygenated hydrocarbons to a separating and concentrating zone; said separating and concentrating zone being open to the atmosphere; (6) in the separating and concentrating zone evaporating to the atmosphere oxygenated hydrocarbons and water from the solution of oxygenated hydrocarbons and (7) recovering the unsaturated hydrocarbon product from the said purified gaseous overhead of step (4).

3. The process for the production of butadiene-1,3 which comprises (1) dehydrogenating a hydrocarbon selected from the group consisting of n-butane, n-butene and mixtures thereof in a dehydrogenation zone by reacting at an elevated temperature of at least 400° C. a mixture of the said hydrocarbon, halogen and oxygen to produce an impure dehydrogenation zone effluent of a temperature of at least 425° C. comprising unsaturated hydrocarbons, steam, methyl halide, oxygenated hydrocarbons, and inorganic halogen; (2) cooling the said dehydrogenation zone effluent to a temperature of between 99° C. and 375° C. to form a gaseous cooled dehydrogenation zone effluent; (3) separating from about 25 to about 99 mol percent of the said inorganic halogen by condensing from 25 to 95 mol percent of the steam from the said gaseous cooled effluent to form an aqueous solution of inorganic halogen; (4) feeding the remaining gaseous phase of the said cooled effluent to an absorbing and cooling column; (5) in the said absorbing and cooling column contacting the said gaseous cooled dehydrogenation zone effluent with an aqueous solvent comprising inorganic halogen for the oxygenated hydrocarbons; the temperature of the inlet gaseous mixture to the absorbing and cooling column being from about 90 to 125° C., the temperature at the bottom of the absorbing and cooling column being from about 49 to 110° C. and the temperature of the exit gases from the absorbing and cooling column being from about 15 to 99° C., to form a solution of the said oxygenated hydrocarbons in the said aqueous solvent comprising inorganic halogen and also to form a purified gaseous overhead containing the methyl halide and the unsaturated hydrocarbons, the said purified gaseous overhead containing at least 10 percent less oxygenated hydrocarbons than in the inlet to the said absorbing and cooling column; (6) feeding the said solution of oxygenated hydrocarbons to a separating and concentrating zone; said separating and concentrating zone being open to the atmosphere; (7) in the separating and concentrating zone evaporating to the atmosphere oxygenated hydrocarbons and water from the solution of oxygenated hydrocarbons and (8) separating the methyl halide from the gaseous overhead of step (5); and (9) recovering the butadiene-1,3 from the remaining gases of step (8).

4. The process for the production of butadiene-1,3 which comprises (1) dehydrogenating a hydrocarbon selected from the group consisting of n-butane, n-butene and mixtures thereof in a dehydrogenation zone by reacting at an elevated temperature of at least 400° C. a mixture comprising the said hydrocarbon, steam and oxygen to produce an impure dehydrogenation zone effluent comprising unsaturated hydrocarbons, steam and oxygenated hydrocarbons; (2) cooling the said dehydrogenation zone effluent to a temperature of between 99° C. and 375° C. to form a gaseous cooled dehydrogenation zone effluent; (3) condensing from 25 to 95 mol percent of the steam from the said gaseous cooled effluent; (4) feeding the remaining gaseous phase of the said cooled effluent to an absorbing and cooling column; (5) in the said absorbing and cooling column contacting the said gaseous cooled dehydrogenation zone effluent with an aqueous solvent for the oxygenated hydrocarbons; the temperature of the inlet gaseous mixture to the absorbing and cooling column being from about 90 to 125° C., the temperature at the bottom of the absorbing and cooling column being from about 49 to 110° C. and the temperature of the exit gases from the absorbing and cooling column being from about 15 to 99° C., to form a solution of the said oxygenated hydrocarbons in the said aqueous solvent and also to form a purified gaseous overhead containing the unsaturated hydrocarbons, the said purified gaseous overhead containing methyl bromide and at least 10 percent less oxygenated hydrocarbons than in the inlet to the said absorbing and cooling column; (6) feeding the said solution of oxygenated hydrocarbons to a separating and concentrating zone; said separating and concentrating zone being open to the atmosphere; (7) in the separating and concentrating zone evaporating to the atmosphere oxygenated hydrocarbons and water from the solution of oxygenated hydrocarbons and (8) separating the methyl bromide from the gaseous overhead of step (5); and (9) recovering the butadiene-1,3 from the remaining gases of step (8).

5. The process for the production of butadiene-1,3 which comprises (1) dehydrogenating a hydrocarbon selected from the group consisting of n-butane, n-butene and mixtures thereof in a dehydrogenation zone by reacting at an elevated temperature of at least 400° C. a mixture comprising the said hydrocarbon, ammonium bromide and oxygen to produce an impure dehydrogenation zone effluent of a temperature of at least 425° C. comprising unsaturated hydrocarbons, methyl bromide, oxygenated hydrocarbons and inorganic bromine including ammonium bromide; (2) cooling the said dehydrogenation zone effluent to a temperature of between 99° C. and 375° C. to form a gaseous cooled dehydrogenation zone effluent; (3) separating from about 25 to about 99 mol percent of the said inorganic bromine including ammonium bromide by condensing from 25 to 95 mol percent of the steam from the said gaseous cooled effluent to form an aqueous solution of inorganic bromine; (4) feeding the remaining gaseous phase of the said cooled effluent to an absorbing and cooling column; (5) in the said absorbing and cooling column contacting the said gaseous cooled dehydrogenation zone effluent with an aqueous solvent comprising inorganic bromine for the oxygenated hydrocarbons; the temperature of the inlet gaseous mixture to the absorbing and cooling column being from about 90 to 125° C., the temperature at the bottom of the absorbing and cooling column being from about 49 to 110° C. and the temperature of the exit gases from the absorbing and cooling column being from about 15 to 99° C., to form a solution of the said oxygenated hydrocarbons in the said aqueous solution of inorganic bromine and also to form a purified gaseous overhead containing the methyl bromide and the unsaturated hydrocarbons, the said purified gaseous overhead containing at least 10 percent less oxygenated hydrocarbons than in the inlet to the said absorbing and cooling column; (6) feeding the said solution of oxygenated hydrocarbons to a separating and concentrating zone; said separating and concentrating zone being open to the atmosphere; (7) in the separating and concentrating zone evaporating to the atmosphere oxygenated hydrocarbons and water from the solution of oxygenated hydrocarbons and (8) separating the methyl bromide from the gaseous overhead of step (5); and (9) recovering the butadiene-1,3 from the remaining gases of step (8).

References Cited

UNITED STATES PATENTS

| | | | |
|---|---|---|---|
| 2,991,320 | 7/1961 | Hearne et al. | 260—680 |
| 3,067,272 | 12/1962 | Voge | 260—680 |
| 3,184,519 | 5/1965 | Newton et al. | 260—680 |

DELBERT E. GANTZ, *Primary Examiner.*

G. E. SCHMITKONS, *Assistant Examiner.*